(12) United States Patent
Kong et al.

(10) Patent No.: US 12,671,914 B2
(45) Date of Patent: Jun. 30, 2026

(54) THERMAL IMAGING SENSOR, AND CAMERA MODULE AND ELECTRONIC DEVICE INCLUDING THERMAL IMAGING SENSOR

(71) Applicant: SAMSUNG ELECTRONICS CO., LTD., Suwon-si (KR)

(72) Inventors: Ki Ho Kong, Suwon-si (KR); Jin Myoung Kim, Suwon-si (KR); Se Yoon Kim, Suwon-si (KR); Du Hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 18/609,632

(22) Filed: Mar. 19, 2024

(65) Prior Publication Data

US 2025/0150725 A1     May 8, 2025

(30) Foreign Application Priority Data

Nov. 8, 2023     (KR) ........................ 10-2023-0153957

(51) Int. Cl.
   *H04N 25/21*       (2023.01)
   *H04N 25/78*       (2023.01)

(52) U.S. Cl.
   CPC ............. *H04N 25/21* (2023.01); *H04N 25/78* (2023.01)

(58) Field of Classification Search
   CPC ........ H04N 25/21; H04N 25/78; H04N 23/23; G01J 5/22; G01J 5/0853; G01J 5/48; G01J 5/80; G01J 2005/0077
   See application file for complete search history.

(56) References Cited

U.S. PATENT DOCUMENTS

| | | | | |
|---|---|---|---|---|
| 5,952,659 | A | * | 9/1999 | Yoneyama ................ G01J 5/20 |
| | | | | 250/370.08 |
| 6,690,013 | B2 | | 2/2004 | McManus |
| 7,105,818 | B2 | | 9/2006 | Anderson et al. |
| 8,610,065 | B2 | | 12/2013 | Ha et al. |
| 8,963,091 | B2 | | 2/2015 | Kim et al. |
| 2003/0122958 | A1 | * | 7/2003 | Olita ...................... H04N 23/50 |
| | | | | 348/E5.025 |
| 2007/0075888 | A1 | * | 4/2007 | Kelly ................... H04N 25/772 |
| | | | | 341/155 |
| 2014/0231651 | A1 | | 8/2014 | Kim et al. |
| 2015/0319379 | A1 | * | 11/2015 | Nussmeier ............. H04N 5/268 |
| | | | | 348/165 |
| 2022/0228920 | A1 | | 7/2022 | Boudou |

FOREIGN PATENT DOCUMENTS

| | | | |
|---|---|---|---|
| KR | 10-1195390 | B1 | 10/2012 |
| KR | 10-2554657 | B1 | 7/2023 |

* cited by examiner

*Primary Examiner* — Kiho Kim
(74) *Attorney, Agent, or Firm* — Sughrue Mion, PLLC

(57) ABSTRACT

A thermal imaging sensor may include: a pixel array in which pixels with microbolometers are arranged in an M×N matrix, where M and N are integers greater than or equal to 2; a row controller configured to output a row control signal through one or more row control signal lines to select and control a predetermined row from among multiple rows; switches connected to the one or more row control signal lines and disposed at each pixel; and a plurality of column integrators configured to read a current signal from the pixel array obtained through a pixel output line and convert it into a voltage signal.

19 Claims, 17 Drawing Sheets

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

420

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

430

| 00 | 01 | 02 | 03 | 04 | 05 | 06 | 07 | 08 | 09 |
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

| 00 | 01 | 02 | 03 | 04 | 05 | 06 | 07 | 08 | 09 |
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

630

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

710

| 00 | 01 | 02 | 03 | 04 | 05 | 06 | 07 | 08 | 09 |
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

820

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

THERMAL IMAGING SENSOR, AND CAMERA MODULE AND ELECTRONIC DEVICE INCLUDING THERMAL IMAGING SENSOR

CROSS-REFERENCE TO RELATED APPLICATION(S)

This application claims priority from Korean Patent Application No. 10-2023-0153957, filed on Nov. 8, 2023, in the Korean Intellectual Property Office, the disclosure of which is incorporated herein by reference in its entirety.

BACKGROUND

1. Field

The following description relates to a thermal imaging sensor including a microbolometer.

2. Description of Related Art

Thermal imaging sensors convert light incoming from a predetermined wavelength band into thermal energy and output it to generate image data.

In an uncooled microbolometer-based thermal imaging sensor, microbolometers corresponding to resistance are included in pixels, and a readout integrated circuit reads the changes in current of pixels due to changes in resistance, converting and outputting the current changes into a thermal image.

Generally, microbolometer-based thermal imaging sensors have a plurality of pixels arranged, and require a complex internal structure for processing measured values, so there is an issue of high power consumption.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of the disclosure, a thermal imaging sensor may include: a pixel array in which pixels with microbolometers are arranged in an M×N matrix, where M and N are integers greater than or equal to 2; a row controller configured to output a row control signal through one or more row control signal lines to select and control a predetermined row from among multiple rows; switches connected to the one or more row control signal lines and disposed at each pixel; and a plurality of column integrators configured to read a current signal from the pixel array obtained through a pixel output line and convert it into a voltage signal.

The thermal imaging sensor further may include a plurality of analog-to-digital converters (ADCs) configured to convert the voltage signal into a digital voltage signal and output digitally converted pixel data.

The thermal imaging sensor further may include an image signal processor (ISP) configured to process the output digitally converted pixel data to obtain image data.

The row controller may be configured to control the switches through the row control signal to drive a predetermined pixel in the pixel array to form a frame.

The row controller may be configured to: drive sequentially from a first row to an Mth row during a first time, driving the switches in odd columns for odd rows and driving the switches in even columns for even rows to form a first frame, drive sequentially from the first row to the Mth row during a second time, driving the switches in the even columns for the odd rows and driving the switches in the odd columns for the even rows to form a second frame, and drive sequentially from the first row to the Mth row during a third time, driving the switches in the odd columns for the odd rows and driving the switches in the even columns for the even rows to form a third frame.

The row controller may be configured to: drive sequentially from a first row to an Mth row during a fourth time, driving the switches in odd columns for each row to form a fourth frame, drive sequentially from the first row to the Mth row during a fifth time, driving the switches in even columns for each row to form a fifth frame, and drive sequentially from the first row to the Mth row during a sixth time, driving the switches in the odd columns for each row to form a sixth frame.

The ADCs may be configured to output first pixel data for the first frame, second pixel data for the second frame, and third pixel data for the third frame.

The ISP may be configured to obtain first image data by adding the first pixel data and the second pixel data.

The ISP may be configured to update the first pixel data in the first image data to the third pixel data to obtain second image data.

The ISP may be configured to update the first pixel data in the first image data to the third pixel data and obtain second image data by applying an amount of variation between the first pixel data and the third pixel data to the second pixel data of the first image data.

A number of row integrators may be N/2, and two consecutive pixel output lines may be connected to each row integrator.

The column integrators may be individually disposed for each column and a switch may be placed between two consecutive column integrators.

A number of column integrators may be N/3, and three consecutive pixel output lines may be connected to each column integrator.

The microbolometers may be configured to detect long-wave infrared radiation emitted from an object.

According to an aspect of the disclosure, a camera module may include: an optical lens; and a microbolometer thermal imaging sensor capable of detecting long-wave infrared radiation emitted from an object to obtain an image based on temperature. The microbolometer thermal imaging sensor may include: a pixel array in which pixels with microbolometers are arranged in an M×N matrix, where M and N are integers greater than or equal to 2; a row controller configured to output a row control signal through one or more row control signal lines to select and control a predetermined row from among multiple rows; switches connected to the one or more row control signal lines and disposed at each pixel; and a plurality of column integrators configured to read a current signal from the pixel array obtained through a pixel output line and convert it into a voltage signal.

The microbolometer thermal imaging sensor further may include a plurality of analog-to-digital converters (ADCs) configured to convert the voltage signal into a digital voltage signal and output digitally converted pixel data, and an image signal processor (ISP) configured to process the output digitally converted pixel data to obtain image data.

The row controller may be configured to control the switches through the row control signal to drive a predetermined pixel in the pixel array to form a frame.

A number of row integrators may be N/2, and two consecutive pixel output lines may be connected to each row integrator.

An electronic device may include: a camera module that may include an optical lens and a microbolometer thermal imaging sensor capable of detecting long-wave infrared (LWIR) radiation emitted from an object to obtain an image based on temperature; and at least one processor configured to perform one or more image processing operations on the image. The microbolometer thermal imaging sensor may include: a pixel array in which pixels with microbolometers are arranged in an M×N matrix, where M and N are integers greater than or equal to 2; a row controller configured to output a row control signal through one or more row control signal lines to select and control a predetermined row from among multiple rows; switches connected to the one or more row control signal lines and disposed at each pixel; and a plurality of column integrators configured to read a current signal from the pixel array obtained through a pixel output line and convert it into a voltage signal.

A number of row integrators may be N/2, and two consecutive pixel output lines may be connected to each row integrator.

Other features and aspects will be apparent from the following detailed description, the drawings, and the claims.

BRIEF DESCRIPTION OF THE DRAWINGS

FIGS. 4A to 4C illustrate output pixel data according to one or more embodiments.

FIGS. 6A to 6C illustrate output pixel data according to one or more embodiments.

FIGS. 7A and 7B illustrate first image data according to one or more embodiments.

FIGS. 8A and 8B illustrate second image data according to one or more embodiments.

Figure 1:
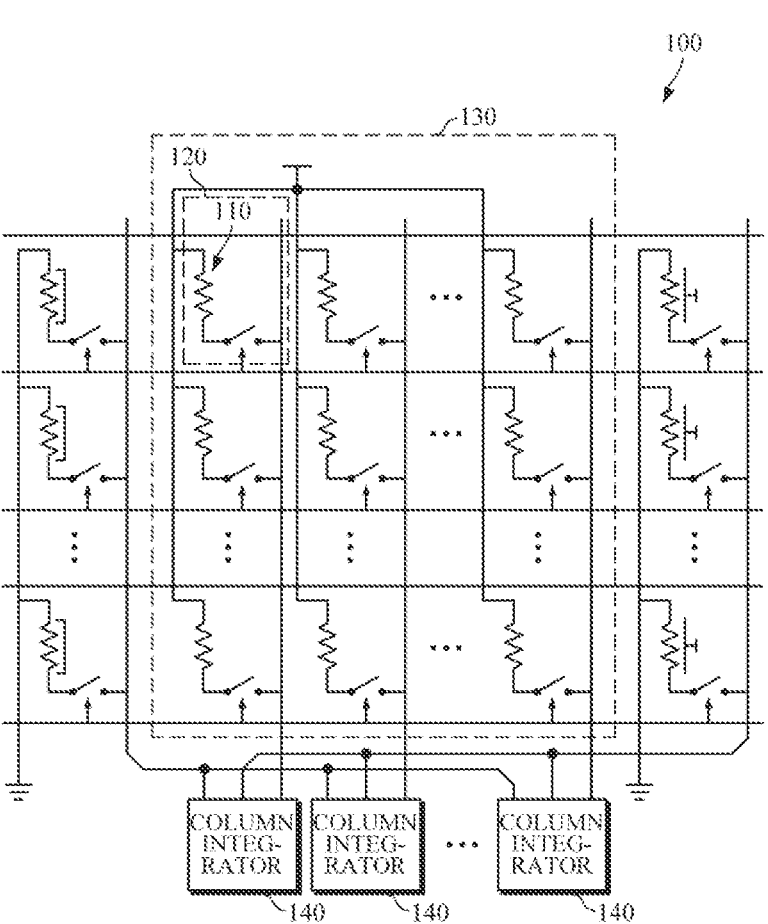
FIG. 1 is a circuit diagram illustrating a thermal imaging sensor including a microbolometer according to one or more embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Reference will now be made in detail to embodiments, examples of which are illustrated in the accompanying drawings. Advantages and features of the disclosure and methods of achieving the same will become apparent with reference to the embodiments described in detail below with reference to the accompanying drawings. Like reference numerals refer to like elements throughout the specification.

Terms such as first, second, and the like may be used to describe various elements, but the elements should not be limited to those terms. These terms may be used for the purpose of distinguishing one element from another element. The singular forms are intended to include the plural forms as well, unless the context clearly indicates otherwise. It will be further understood that when an element is referred to as "comprising" or "including" another element, the element is intended not to exclude one or more other elements, but to further include one or more other elements, unless explicitly described to the contrary. Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

Expressions, "at least one of A and B" and "at least one of A or B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2.

FIG. 1 is a circuit diagram schematically illustrating a thermal imaging sensor including a microbolometer according to one or more embodiments.

A bolometer is a device that measures the radiant energy emitted from an object, and it has the characteristic of internal resistance changing when absorbing infrared (IR) radiation. A bolometer-based thermal imaging sensor use this characteristic to read changes in current due to changes in resistance and output a thermal image. To achieve a higher resolution in such a thermal imaging sensor, a large number of small pixels, including small bolometers, referred to as microbolometers, are included in the sensor.

Referring to FIG. 1, a thermal imaging sensor 100 includes a two-dimensional array of pixels 120 including microbolometers 110, forming a pixel array 130. To read the current of the pixel array 130, a column integrator 140 is placed for each column of the pixel array 130.

The power consumption for driving the thermal imaging sensor is mainly generated by the column integrators 140, accounting for approximately 90% of the total power consumption. Controlling the operation of the column integrators 140 can reduce power consumption and provide stable sensor operation.

Figure 2A:
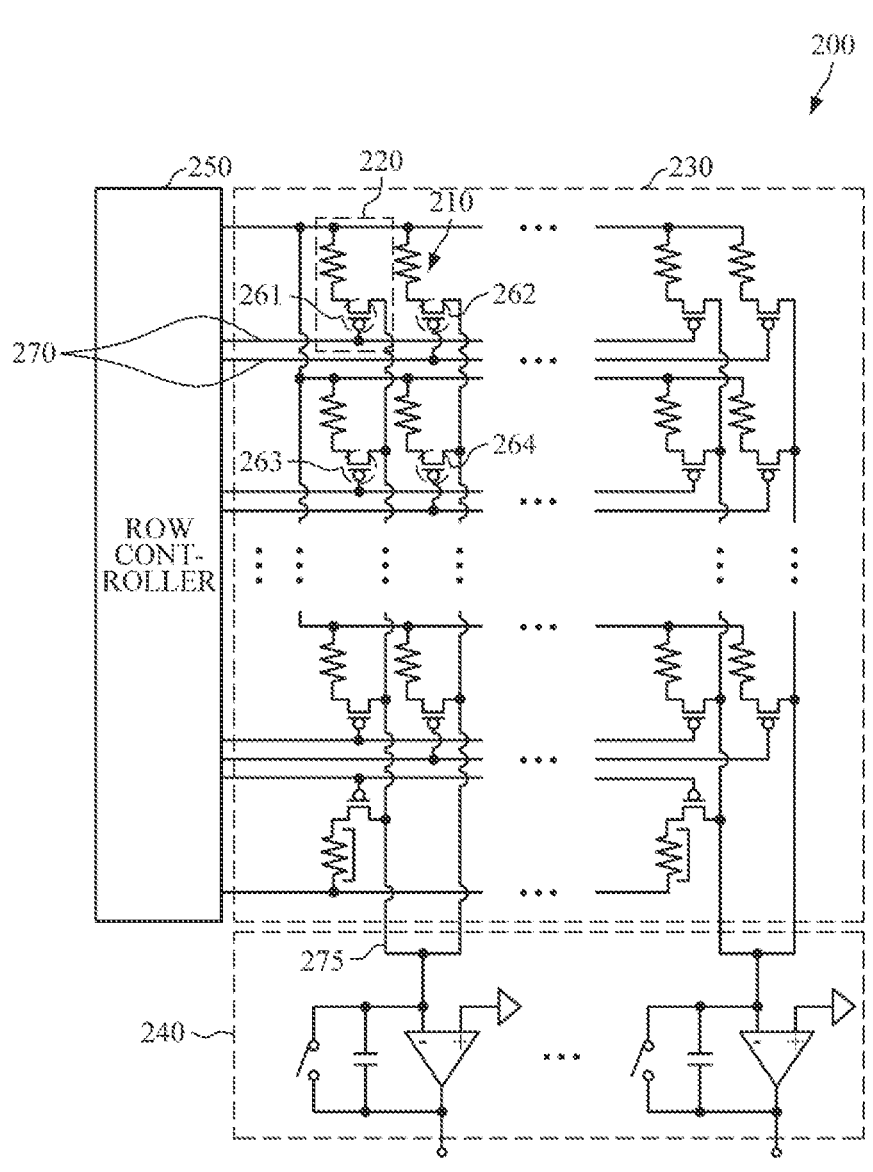
FIG. 2A is a circuit diagram illustrating a thermal image sensor including a microbolometer according to one or more embodiments.
Figure 2B:
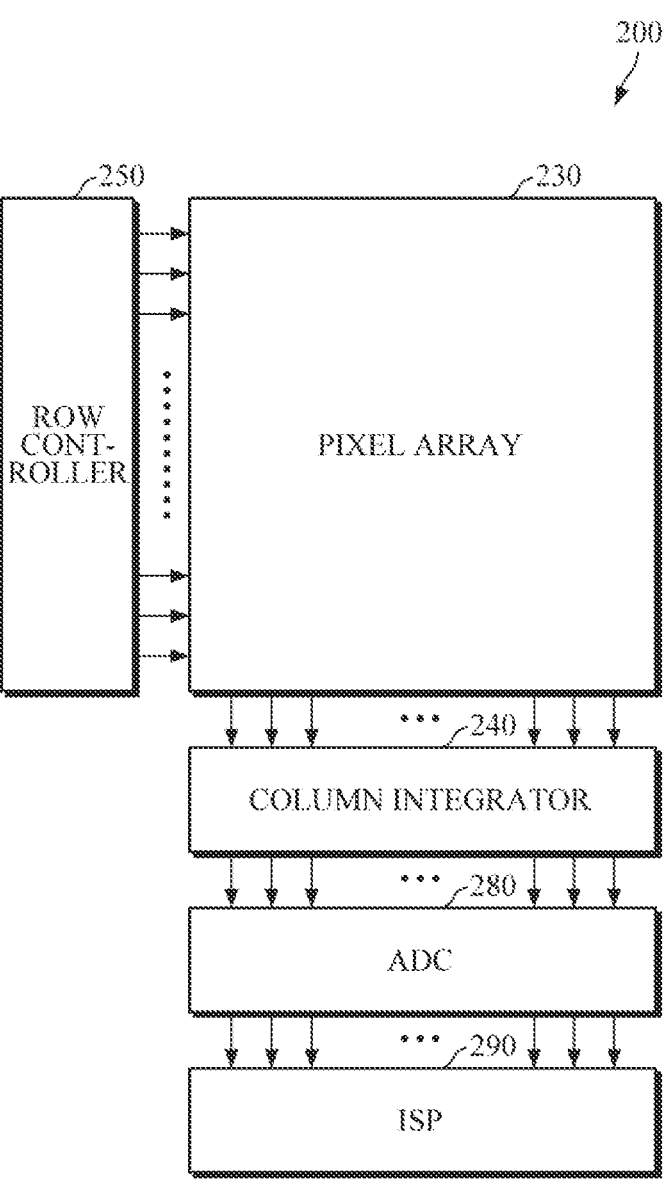
FIG. 2B is a block diagram illustrating a thermal imaging sensor including a microbolometer according to one or more embodiments.

FIG. 2A is a circuit diagram illustrating a thermal image sensor including a microbolometer according to one or more embodiments. FIG. 2B is a block diagram illustrating a thermal imaging sensor including a microbolometer according to one or more embodiments.

Referring to FIGS. 2A and 2B, a thermal imaging sensor 200 may include a pixel array 230, a row controller 250, a column integrator 240, an analog-to-digital converter (ADC) 280, and an image signal processor (ISP) 290.

The pixel array 230 may include a plurality of pixels 220 each including a microbolometer 210, and the pixels 220 may be arranged in a two-dimensional matrix form of M×N (where M and N are integers greater than or equal to 2). A pixel may be the smallest independent unit within the thermal imaging sensor 200 that operates to capture and display a specific color. The microbolometers 210 may detect long-wave infrared (LWIR) radiation emitted from an object, such as wavelengths around 8 μm to 14 μm.

The row controller 250 may output a row control signal, which selects and controls predetermined rows among the rows, through one or more row control signal lines 270. The row controller 250 may include a separate signal controller configured to generate row control signals (e.g., row address signals) or a row decoder configured to decode the row control signals. The configuration included in the row controller 250 is not limited to this.

The column integrator 240 may read a current signal of the pixel array 230 acquired through the pixel output lines 275 and convert the same into a voltage signal. The column integrator 240 may be composed of an amplifier, a feedback capacitor, a switch, etc., and is not limited thereto.

There may be a plurality of ADCs 280 and the ADC 280 may convert the voltage signal converted by the column integrator 240 into a digital voltage signal, and output digitally converted pixel data.

The ISP 290 may acquire image data through the processing of the output pixel data. For example, the ISP 290 may obtain desired image data through processing such as editing, enhancement, restoration, conversion, or compression of the pixel data.

The thermal imaging sensor 200 may further include switches 261, 262, 263, and 264 connected to the row control signal lines 270 and disposed at each pixel 220. The switches 261, 262, 263, and 264 may be implemented with any one or any combination of metal-oxide-semiconductor field-effect transistors (MOSFET), bipolar junction transistors, Insulated-Gate Bipolar Transistor (IGBT), and relay switches.

In this case, the row controller 250 may control the switches 261, 262, 263, and 264 through row control signals, selectively driving predetermined pixels within the pixel array 230 to form an image frame.

For example, during a first time, the row controller 250 may sequentially drive pixels 220 from a first row to an Mth row, driving switches 261 in odd columns for odd rows and driving switches 264 in even columns for even rows, to form a first frame.

Additionally, during a second time, the row controller 250 may sequentially drive the pixels 220 from the first row to the Mth row, driving switches 262 in even columns for the odd rows and driving switches 263 in the odd columns for even rows, to form a second frame.

In addition, during a third time, the row controller 250 may sequentially drive the pixels 220 from the first row to the Mth row, driving the switches 261 in the odd columns for the odd rows and driving the switches 264 in the even columns for the odd rows, to form a third frame.

In this case, the first time, the second time, and the third time may be consecutive periods of time at regular intervals, during each of which one frame is created.

Figure 3:
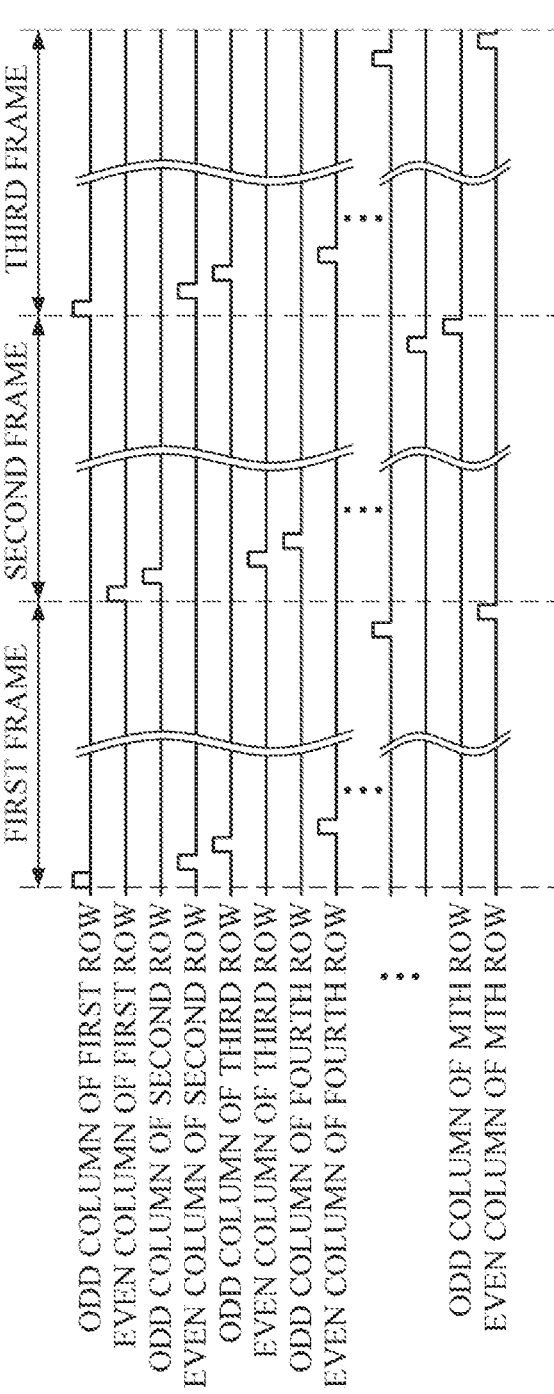
FIG. 3 is a timing diagram for driving pixels by a row controller according to one or more embodiments.

FIG. 3 is a timing diagram for driving the pixels 220 by the row controller 250 according to one or more embodiments.

Referring to FIG. 3, the row controller 250 may drive the pixels 220 row by row from the first row to the Mth row for a predetermined time, wherein odd columns are driven in the first row, even columns in the second row, odd columns in the third row, even columns in the fourth row, and so on, up to even columns in the Mth row, thereby driving half of the total number of pixels 220. Consequently, the first frame may be generated.

Furthermore, after the first frame is generated, the row controller 250 may drive the pixels 220 row by row from the first row to the Mth row for a predetermined time, wherein even columns are driven in the first row, odd columns in the second row, even columns in the third row, odd columns in the fourth row, and so on, up to odd columns in the Mth row, thereby driving half of the total number of pixels 220. Consequently, the second frame may be generated.

Moreover, after the second frame is generated, the row controller 250 may drive the pixels 220 row by row from the first row to the Mth row for a predetermined time, wherein odd columns are driven in the first row, even columns in the second row, odd columns in the third row, even columns in the fourth row, and so on, up to even columns in the Mth row, thereby driving half of the total number of pixels 220. Consequently, the third frame may be generated.

In another embodiment, during a fourth time, the row controller 250 may sequentially drive from the first row to the Mth row, driving switches in odd columns for each row to form a fourth frame. Similarly, during a fifth time, the row controller 250 may sequentially drive from the first row to the Mth row, driving switches in even columns for each row to form a fifth frame. During a sixth time, the row controller 250 may sequentially drive from the first row to the Mth row, driving switches in odd columns for each row to form a sixth frame.

In this case, the fourth time, the fifth time, and the sixth time can be consecutive periods of time at regular intervals, during each of which one frame is created.

Figure 5:
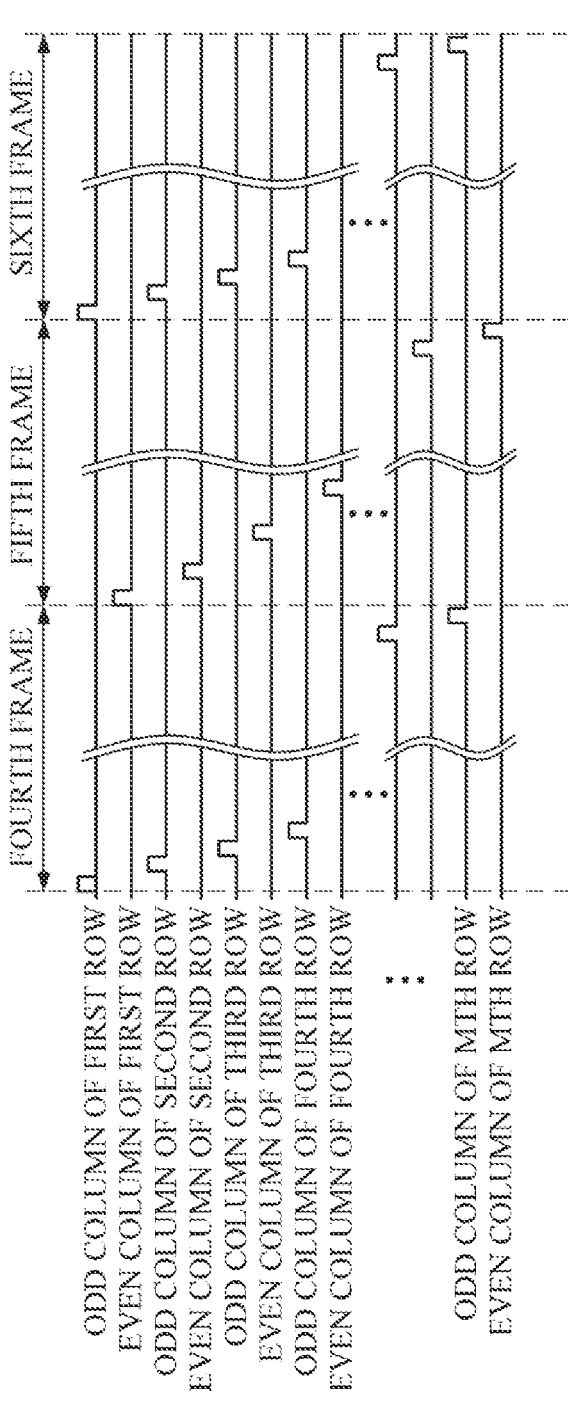
FIG. 5 is a timing diagram for driving pixels by a row controller according to one or more embodiments.

FIG. 5 is a timing diagram for driving the pixels 220 by the row controller 250 according to another embodiment.

Referring to FIG. 5, the row controller 250 may drive the pixels 220 row by row from the first row to the Mth row during a predetermined time, driving odd columns for each row, thereby driving half of the total number of pixels 220. Consequently, the fourth frame may be generated.

Additionally, after the fourth frame is generated, the row controller 250 may drive the pixels 220 row by row from the first row to the Mth row for a predetermined time, driving even columns for each row, thus driving half of the total number of pixels 220. Consequently, the fifth frame may be generated.

Moreover, after the fifth frame is generated, the row controller 250 may drive the pixels 220 row by row from the first row to the Mth row for a predetermined time, driving odd columns for each row, thus driving half of the total number of pixels 220. Accordingly, the sixth frame may be generated.

The number of pixels 220 being driven to generate each frame is only half of the total number of pixels in the pixel array 230. Therefore, the column integrators 240 connected to the pixel output lines 275 do not need to be arranged one per column, unlike the typical thermal imaging sensor described in FIG. 1.

Referring back to FIG. 2A, the number of column integrators 240 may be N/2, which corresponds to half the number of columns in the pixel array 230. In this configuration, two consecutive pixel output lines 275 may be connected to each column integrator 240.

In one or more embodiments, the column integrators 240 may be individually disposed for each column. In this case, a separate switch may be placed between two consecutive column integrators 240, allowing the selection of the column integrator 240 to be used through adjusting of the switch.

In another embodiment, within the thermal imaging sensor 200, each pixel may have one of the three switches, a first switch, a second switch, and a third switch. The row controller 250 may drive ⅓ of the pixels in the pixel array through row control signals to form a frame. In this case, the number of column integrators may be N/3, and three consecutive pixel output lines may be connected to each column integrator. However, the number of switches and the number of pixel output lines connected to each column integrator are not limited thereto.

The ADC may output digitally converted pixel data for frames formed through the column integrator.

FIGS. 4A to 4C and FIGS. 6A to 6C illustrate output pixel data according to one or more embodiments.

Figure 4B:
Figure 4C:

Referring to FIGS. 3, 4A, 4B, and 4C, the ADC may output first pixel data 410 for the first frame formed by driving the pixels 220 (FIG. 4A), second pixel data 420 for the second frame (FIG. 4B), and third pixel data 430 for the third frame (FIG. 4C).

Figure 6C:

Additionally, referring to FIGS. 5, 6A, 6B, and 6C, the ADC may output fourth pixel data 610 for the fourth frame formed by driving the pixels 220 (FIG. 6A), fifth pixel data 620 for the fifth frame (FIG. 6B), and sixth pixel data 630 for the sixth frame (FIG. 6C).

The ISP may obtain image data by processing the pixel data output from the ADC. For example, the ISP may combine pixel data to generate image data and may sequentially generate image data by updating pixels in the generated image data.

Figure 7A:
Figure 7B:
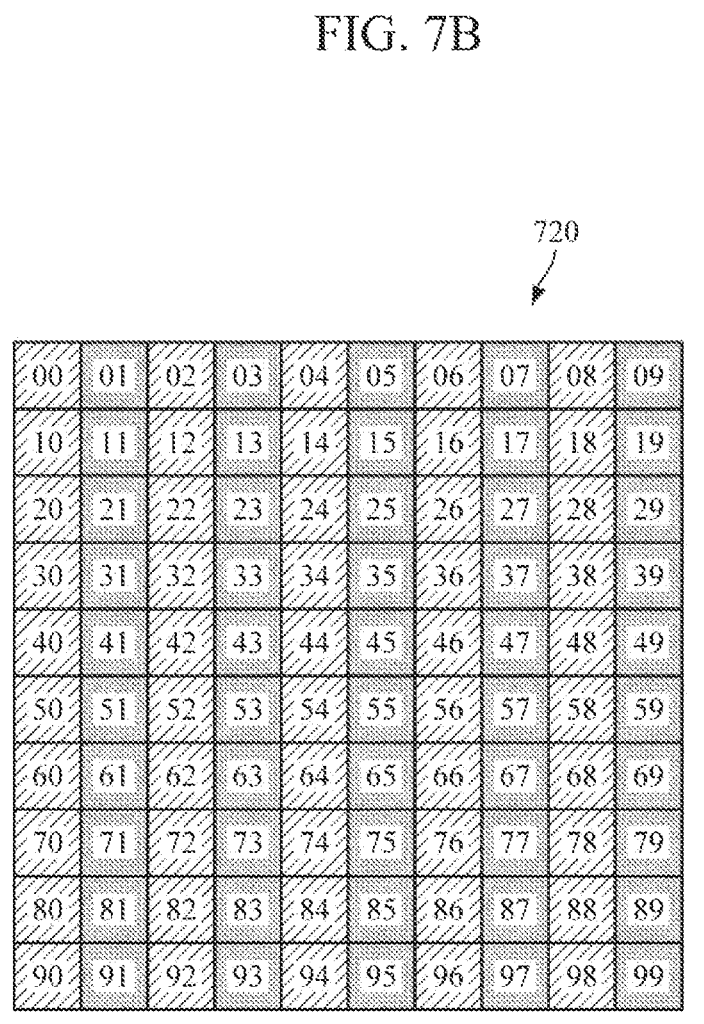

FIGS. 7A and 7B illustrate first image data according to one or more embodiments.

For example, the ISP may obtain first image data 710 by adding the first pixel data 410 and the second pixel data 420 (FIG. 7A) and obtain first image data 720 by adding the fourth pixel data 610 and the fifth pixel data 620 (FIG. 7B).

Figure 8B:

FIGS. 8A and 8B illustrate second image data according to one or more embodiments.

For example, the ISP may obtain second image data 810 by updating the first pixel data 410 in the first image data 710 to the third pixel data 430 (FIG. 8A) and obtain second image data 820 by updating the fourth pixel data 610 in the first image data 720 to the sixth pixel data 630 (FIG. 8B).

According to another embodiment, the ISP may update the first pixel data 410 within the first image data 710 to the third pixel data 430, and obtain the second image data by applying an amount of variation between the first pixel data 410 and the third pixel data 430 to the second pixel data 420 of the first image data 710. Furthermore, the ISP may update the fourth pixel data 610 within the first image data 720 to the sixth pixel data 630 and obtain the second image data by applying the amount of variation between the fourth pixel data 610 and the sixth pixel data 630 to the fifth pixel data 620 of the first image data 720.

In one embodiment, a thermal sensor based on a microbolometer may use all the column integrators for the entire operation of the pixel array. While this embodiment delivers high resolution, it may require high power consumption and a large sensor size.

However, according to other embodiments described in the present disclosure, by acquiring frames with partially driven pixel arrays and column integrators and combining them into a single piece of image data, electronic devices like smartphones equipped with a thermal image sensor may capture thermal images of relatively slow-moving objects with minimal resolution degradation. These embodiments reduce the use of the column integrators, thus decreasing static power consumption, and mitigate heat generation during readout.

Figure 9:
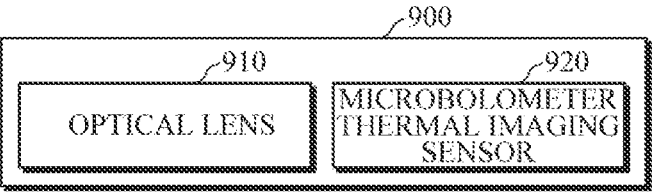
FIG. 9 is a block diagram illustrating a camera module including a microbolometer thermal imaging sensor according to one or more embodiments.

FIG. 9 is a block diagram illustrating a camera module including a microbolometer thermal imaging sensor according to one or more embodiments.

Referring to FIG. 9, a camera module 900 may include an optical lens 910 and a microbolometer thermal imaging sensor 920.

The optical lens 910 may be an infrared lens formed of high refractive index materials such as germanium (Ge) or calcium fluoride ($CaF_2$) to focus infrared energy onto the sensor.

The microbolometer thermal imaging sensor 920 is a sensor capable of detecting long-wave infrared (LWIR) radiation emitted from an object and acquiring an image based on temperature.

The microbolometer thermal imaging sensor according to one or more embodiments may include a pixel array in which pixels with microbolometers are arranged in an M×N matrix (where M and N are integers greater than or equal to 2), a row controller configured to output a row control signal through one or more row control signal lines to select and control a predetermined row among multiple rows, switches connected to the row control signal lines and disposed at each pixel, a plurality of column integrators configured to read a current signal from the pixel array obtained through the pixel output lines and convert it into a voltage signal, a plurality of ADCs configured to convert the converted voltage signal into a digital voltage signal to output digitally converted pixel data, and an ISP configured to process the output pixel data to obtain image data.

The row controller may control the switch through the row control signal to drive a predetermined pixel in the pixel array to form a frame.

The number of row integrators formed may be N/2, and two consecutive pixel output lines may be connected to each row integrator.

Figure 10:
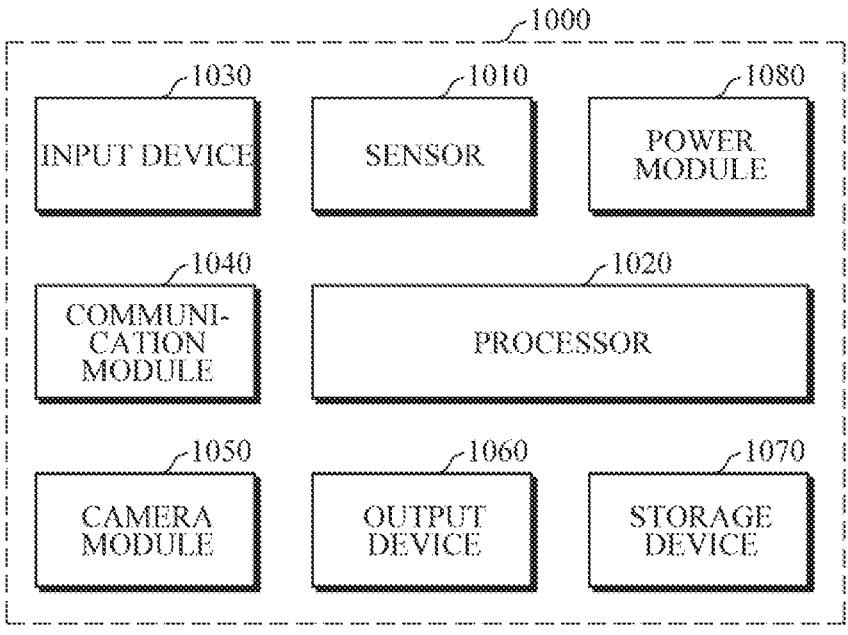
FIG. 10 is a block diagram illustrating an electronic device including a camera module according to one or more embodiments.

FIG. 10 is a block diagram illustrating an electronic device including a camera module according to one or more embodiments.

An electronic device described below may include, for example, a wearable device, a smartphone, a tablet PC, a mobile phone, a video phone, an e-book reader, a desktop PC, a laptop, a netbook computer, a workstation, a server, a PDA, a portable multimedia player (PMP), an MP3 player, a medical device, a camera, or a combination thereof. The wearable device may include at least one of an accessory type (e.g., a watch, a ring, a bracelet, an anklet, a necklace, glasses, a contact lens, or Head-Mounted Device (HMD)), a fabric or clothing-integrated type (e.g., an electronic cloth), a body-attached type (e.g., a skin pad or tattoo), and a body-implanted type (e.g., an implantable circuit).

However, the electronic device is not limited thereto and may include at least one of various medical equipment (e.g., various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device). However, the electronic device is not limited to the aforementioned devices.

Referring to FIG. 10, an electronic device 1000 may include a sensor 1010, a processor 1020, an input device 1030, a communication module (e.g., a communication INTERFACE) 1040, a camera module 1050, an output device 1060, a storage device 1070, and a power module 1080. The components of the electronic device 1000 may be integrally mounted on a specific device or distributed across two or more devices.

The sensor 1010 may detect the operating state of the electronic device 1000 (e.g., temperature, power, etc.) or external environmental conditions (e.g., user status) and generate electrical signals and/or data corresponding to the detected state. The sensor 1010 may include a gyro sensor, a pulse sensor, an acceleration sensor, a fingerprint sensor, and the like, and is not limited thereto.

The processor 1020 may control the components connected to the processor 1020 by executing programs stored in the storage device 1070 and perform various data processing or computations. The processor 1020 may include a main processor, such as a central processing unit (CPU) and an auxiliary processor capable of operating independently of or together with the main processor (e.g., a graphics processing unit, an image signal processor, a sensor hub processor, a communication processor, etc.).

The input device 1030 may receive, from a user or the like, commands and/or data to be used by the components of the electronic device 1000. The input device 1030 may include a microphone, a mouse, a keyboard, and/or a digital pen (a stylus pen, etc.).

The communication module 1040 may establish a direct (wired) communication channel and/or a wireless communication channel between the electronic device 1000 and another electronic device or a server in a network environment, or the sensor 1010 and may support communication through the established communication channel. The communication module 1040 may include one or more communication processors that operate independently of the processor 1020 and support direct communication and/or wireless communication.

The communication module 1040 may include a wireless communication module, such as a cellular communication module, a short-range wireless communication module, a global navigation satellite system (GNSS) communication module, etc., and/or a wired communication module, such as a local area network (LAN) communication module, a power line communication module, etc. These various types of communication modules may be integrated into a single chip, or may be implemented as a plurality of chips separate from each other. The wireless communication module may identify and authenticate the electronic device 1000 within the communication network by using subscriber information (e.g., international mobile subscriber identity (IMSI), etc.) stored in a subscriber identity module.

The camera module 1050 may capture a still image and a moving image. The camera module 1050 may include an optical lens and a microbolometer thermal imaging sensor capable of detecting infrared radiation emitted from an object and obtaining an image based on temperature.

The microbolometer thermal imaging sensor may include a pixel array in which pixels with microbolometers are arranged in an M×N matrix (where M and N are integers greater than or equal to 2), a row controller configured to output a row control signal through one or more row control signal lines to select and control a predetermined row among multiple rows, switches connected to the row control signal lines and disposed at each pixel, and a plurality of column integrators configured to read a current signal from the pixel array obtained through the pixel output lines and convert the current signal into a voltage signal.

The number of row integrators formed may be N/2, and two consecutive pixel output lines may be connected to each row integrator.

The processor 1020 may perform one or more image processing operations on the thermal images acquired by the camera module 1050.

The output device 1060 may visually or non-visually output data generated or processed by the electronic device

1000. The output device 1060 may include an audio output device, a display device, an audio module, and/or a haptic module.

An audio output device may output audio signals to the outside of the electronic device 1000. The audio output device may include a speaker and/or a receiver. The speaker may be used for general purposes such as multimedia playback or recorded playback, while the receiver may be used to receive incoming calls. The receiver may be coupled as part of the speaker or implemented as an independent separate device.

A display device may provide information visually to the outside of the electronic device 1000. The display device may include a display, a holographic device, a projector, or control circuitry for controlling such devices. The display device may also include touch circuitry set to detect touches or sensor circuitry (such as a pressure sensor) set to measure the intensity of force generated by touch.

The audio module may convert sound into electrical signals or vice versa. The audio module may acquire sound through the input device or output sound through the audio output device or a speaker and/or a headphone of another electronic device directly or wirelessly connected to the electronic device 1000.

The haptic module may convert an electrical signal into a mechanical stimulus (vibration, movement, etc.) or an electrical stimulus which a user may recognize through a tactile or kinesthetic sense. The haptic module may include a motor, a piezoelectric element, and/or an electrical stimulator.

The storage device 1070 may store operating conditions for operating the sensor 1010 and various data for usage by other components of the electronic device 1000 such as, for example, input data and/or output data for software and related commands, and the like. The storage device 1070 may include volatile memory or nonvolatile memory.

The power module 1080 may manage power supplied to the electronic device 1000. The power module may be implemented as at least part of a power management integrated circuit (PMIC). The power module 1080 may include a battery, and the battery may include a primary cell which is not rechargeable, a secondary cell which is rechargeable, or a fuel cell.

The current embodiments can be implemented by computer readable code stored on a non-transitory computer readable medium. The computer readable medium includes all types of recording media in which computer readable data are stored.

Examples of the computer readable medium include a ROM, a RAM, a CD-ROM, a magnetic tape, a floppy disk, and an optical data storage. Further, the computer readable medium may be implemented in the form of a carrier wave such as Internet transmission. In addition, the computer readable medium may be distributed to computer systems over a network, in which computer readable codes may be stored and executed in a distributed manner. Additionally, function programs, code, and code segments for implementing the current embodiments can be inferred by a computer programmer skilled in the art to which the disclosure pertains.

While this disclosure includes specific examples, it will be apparent to one of ordinary skill in the art that various changes in form and details may be made in these examples without departing from the spirit and scope of the claims and their equivalents. The embodiments described above are to be considered in a descriptive sense only, and not for purposes of limitation.

What is claimed is:

1. A thermal imaging sensor comprising:
a pixel array in which pixels with microbolometers are arranged in an M×N matrix, where M and N are integers greater than or equal to 2;
a row controller configured to output a row control signal through one or more row control signal lines to select and control a predetermined row from among multiple rows;
switches connected to the one or more row control signal lines and disposed at each of the pixels; and
a plurality of column integrators configured to read a current signal from the pixel array obtained through a pixel output line of the pixel array and convert the current signal into a voltage signal,
wherein the row controller is further configured to:
drive sequentially from a first row to an Mth row during a first time, by driving the switches in odd columns for odd rows and driving the switches in even columns for even rows to form a first frame;
drive sequentially from the first row to the Mth row during a second time, by driving the switches in the even columns for the odd rows and driving the switches in the odd columns for the even rows to form a second frame; and
drive sequentially from the first row to the Mth row during a third time, by driving the switches in the odd columns for the odd rows and driving the switches in the even columns for the even rows to form a third frame.

2. The thermal imaging sensor of claim 1, further comprising a plurality of analog-to-digital converters (ADCs) configured to convert the voltage signal into a digital signal comprising pixel data, and output the pixel data.

3. The thermal imaging sensor of claim 2, further comprising an image signal processor (ISP) configured to process the output pixel data to obtain image data.

4. The thermal imaging sensor of claim 3, wherein the row controller is further configured to control the switches through the row control signal to drive a predetermined pixel in the pixel array to obtain the image.

5. The thermal imaging sensor of claim 4, wherein the row controller is further configured to:
drive sequentially from the first row to the Mth row during a fourth time, by driving the switches in the odd columns for each row to form a fourth frame,
drive sequentially from the first row to the Mth row during a fifth time, by driving the switches in the even columns for each row to form a fifth frame, and
drive sequentially from the first row to the Mth row during a sixth time, by driving the switches in the odd columns for each row to form a sixth frame.

6. The thermal imaging sensor of claim 4, wherein the ADCs are further configured to output first pixel data for the first frame, second pixel data for the second frame, and third pixel data for the third frame.

7. The thermal imaging sensor of claim 6, wherein the ISP is further configured to obtain first image data by adding the first pixel data and the second pixel data.

8. The thermal imaging sensor of claim 7, wherein the ISP is further configured to update the first pixel data in the first image data to the third pixel data to obtain second image data.

9. The thermal imaging sensor of claim 7, wherein the ISP is further configured to update the first pixel data in the first image data to the third pixel data and obtain second image data by applying an amount of variation between the first pixel data and the third pixel data to the second pixel data of the first image data.

10. The thermal imaging sensor of claim 1, wherein a number of row integrators is N/2, and two consecutive pixel output lines of the pixel array are connected to each of the row integrators.

11. The thermal imaging sensor of claim 1, wherein the plurality of column integrators are individually disposed for each of the plurality of columns and the switches are placed between two consecutive column integrators, among the plurality of column integrators.

12. The thermal imaging sensor of claim 1, wherein a number of column integrators is N/3, and three consecutive pixel output lines of the pixel array are connected to each of the plurality of column integrators.

13. The thermal imaging sensor of claim 1, wherein the microbolometers are configured to detect infrared radiation emitted from an object.

14. A camera module comprising:
an optical lens; and
a microbolometer thermal imaging sensor configured to detect infrared radiation emitted from an object to obtain an image based on temperature, wherein the microbolometer thermal imaging sensor comprises:
a pixel array in which pixels with microbolometers are arranged in an M×N matrix, where M and N are integers greater than or equal to 2;
a row controller configured to output a row control signal through one or more row control signal lines to select and control a predetermined row from among multiple rows;
switches connected to the one or more row control signal lines and disposed at each of the pixels; and
a plurality of column integrators configured to read a current signal from the pixel array obtained through a pixel output line of the pixel array and convert the current signal into a voltage signal,
wherein the row controller is further configured to:
drive sequentially from a first row to an Mth row during a first time, by driving the switches in odd columns for odd rows and driving the switches in even columns for even rows to form a first frame;
drive sequentially from the first row to the Mth row during a second time, by driving the switches in the even columns for the odd rows and driving the switches in the odd columns for the even rows to form a second frame; and
drive sequentially from the first row to the Mth row during a third time, by driving the switches in the odd columns for the odd rows and driving the switches in the even columns for the even rows to form a third frame.

15. The camera module of claim 14, wherein the microbolometer thermal imaging sensor further comprises:
a plurality of analog-to-digital converters (ADCs) configured to convert the voltage signal into a digital signal comprising pixel data, and output the pixel data; and
an image signal processor (ISP) configured to process the output pixel data to obtain image data.

16. The camera module of claim 14, wherein the row controller is further configured to control the switches through the row control signal to drive a predetermined pixel in the pixel array to form a frame.

17. The camera module of claim 14, wherein a number of row integrators is N/2, and two consecutive pixel output lines of the pixel array are connected to each of the row integrators.

18. An electronic device comprising:

a camera module comprising an optical lens and a microbolometer thermal imaging sensor configured to detect infrared radiation emitted from an object to obtain an image based on temperature; and at least one processor configured to perform one or more image processing operations on the image, wherein the microbolometer thermal imaging sensor comprises:

a pixel array in which pixels with microbolometers are arranged in an M×N matrix, where M and N are integers greater than or equal to 2;

a row controller configured to output a row control signal through one or more row control signal lines to select and control a predetermined row from among multiple rows;

switches connected to the one or more row control signal lines and disposed at each of the pixels; and a plurality of column integrators configured to read a current signal from the pixel array obtained through a pixel output line of the pixel array and convert the current signal into a voltage signal, wherein the row controller is further configured to:

drive sequentially from a first row to an Mth row during a first time, by driving the switches in odd columns for odd rows and driving the switches in even columns for even rows to form a first frame;

drive sequentially from the first row to the Mth row during a second time, by driving the switches in the even columns for the odd rows and driving the switches in the odd columns for the even rows to form a second frame; and drive sequentially from the first row to the Mth row during a third time, by driving the switches in the odd columns for the odd rows and driving the switches in the even columns for the even rows to form a third frame.

19. The electronic device of claim 18, wherein a number of row integrators is N/2, and two consecutive pixel output lines of the pixel array are connected to each of the row integrators.

\* \* \* \* \*